United States Patent
Agarwal et al.

(10) Patent No.: US 9,275,175 B2
(45) Date of Patent: Mar. 1, 2016

(54) INTEGRATED CIRCUIT CLOCK TREE VISUALIZER

(71) Applicant: Oracle International Corporation, Redwood Shores, CA (US)

(72) Inventors: Amit Agarwal, Milpitas, CA (US); Alexander Korobkov, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 14/179,127

(22) Filed: Feb. 12, 2014

(65) Prior Publication Data
US 2015/0227660 A1 Aug. 13, 2015

(51) Int. Cl.
*G06F 17/50* (2006.01)
(52) U.S. Cl.
CPC ........ *G06F 17/5022* (2013.01); *G06F 17/5045* (2013.01); *G06F 2217/62* (2013.01); *G06F 2217/74* (2013.01)
(58) Field of Classification Search
CPC .................................................. G06F 17/5022
USPC ......................................................... 716/139
See application file for complete search history.

(56) References Cited

U.S. PATENT DOCUMENTS 8,966,425 B1 * 2/2015 Eisenstadt et al. ............ 716/120

OTHER PUBLICATIONS

B. Naveen et al.; "An Automatic Netlist-to-Schematic Generator" IEEE Design & Test of Computers; Mar. 1993.
Bikram Garg et al.; "Partitioning, Floor Planning, Detailed Placement and Routing Techniques for Schematic Generation of Analog Netlist"; 2008 IEEE.
"Post-Layout Symbolic Clock-Tree Generator" Visualizer.odt; Oct. 11, 2013.
Nam-Hoon Kim et al.; "RightTopologizer: An Efficient Schematic Generator for Multi-level Optimization"; IEEE 2007; pp. 387-391.
Pierluigi Daglio et al.; "Building the Hierarchy from a Flat Netlist for a Fast and Accurate Post-Layout Simulation with Parasitic Components"; Proceedings of the Design; Automation and Test in Europe Conference and Exhibition Designers' Forum; IEEE 2004.

* cited by examiner

*Primary Examiner* — Thuan Do
(74) *Attorney, Agent, or Firm* — Miles & Stockbridge P.C.

(57) ABSTRACT

A system that visualizes a clock tree for an integrated circuit receives an extracted cell library, an extracted clock netlist including clock headers and interconnects, and simulation results. The system generates an internal data structure for the clock headers, and divides the clock headers into a plurality of levels based on the interconnects. The system then orders the clock headers from a lowest level to a highest level, and displays the ordered clock headers in an untangled manner.

21 Claims, 7 Drawing Sheets

INTEGRATED CIRCUIT CLOCK TREE VISUALIZER

FIELD

One embodiment is directed generally to integrated circuit design, and in particular to a clock tree visualizer used for integrated circuit design.

BACKGROUND INFORMATION

Most digital integrated circuits ("IC"s) of sufficient complexity use a clock signal in order to synchronize different parts of the circuit. The signal should cycle at a rate less than the worst-case internal propagation delays. In some cases, more than one clock cycle is required to perform a predictable action. As ICs become more complex, the problem of supplying accurate and synchronized clocks to all the circuits becomes increasingly difficult.

For complex ICs, a clock distribution network distributes the clock signal from a common point to all the elements that need it. The most effective way to get the clock signal to every part of a chip that needs it, with the lowest skew, is a metal grid that drives a "clock tree". Since this function is vital to the operation of a synchronous system, much attention during the design of the IC is typically given to the characteristics of these clock signals and the electrical networks used in their distribution. In a large microprocessor, the power used to drive the clock signal can be over 30% of the total power used by the entire chip. The entire structure including gates and amplifiers generally have to be loaded and unloaded every cycle.

When designing ICs, in the physical layout stage where the parasitics are extracted, it has become increasingly difficult to debug the complex clock trees, in particular for clock trees with unknown structures. These clock trees typically include thousands of gates, and after extraction the total number of linear and non-linear devices can be in the millions. Because of this complexity, it has become very difficult for the IC designers to tweak or modify the clock tree if the result of the simulation does not meet the specification. In general, known IC design methods perform these modifications by analyzing the clock tree in its native form, which is a text-based file that includes an enormous amount of details to review.

SUMMARY

One embodiment is a system that visualizes a clock tree for an integrated circuit. The system receives an extracted cell library, an extracted clock netlist including clock headers and interconnects, and simulation results. The system generates an internal data structure for the clock headers, and divides the clock headers into a plurality of levels based on the interconnects. The system then orders the clock headers from a lowest level to a highest level, and displays the ordered clock headers in an untangled manner.

DETAILED DESCRIPTION

Figure 1:
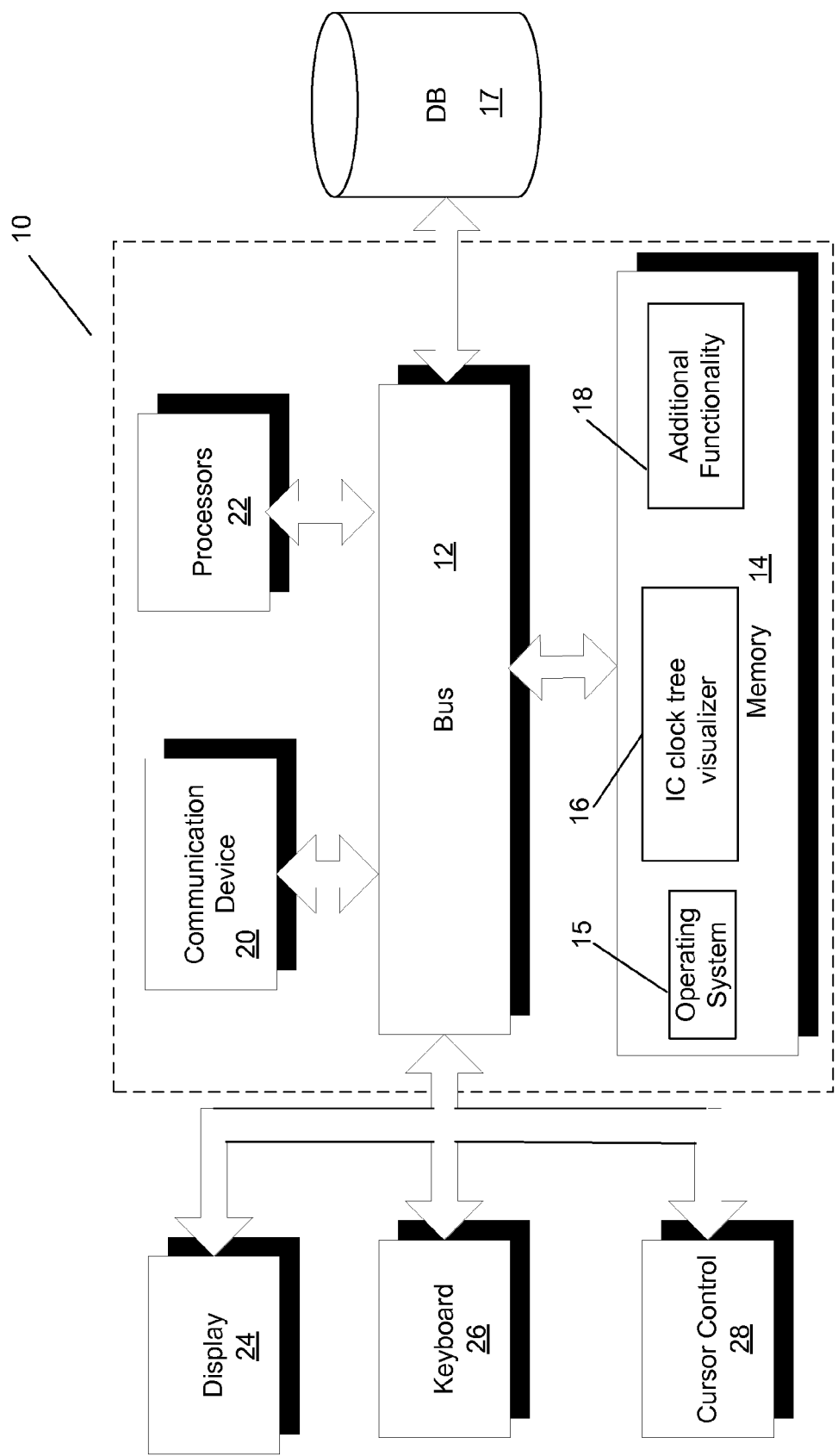
FIG. 1 is a block diagram of a computer server/system in accordance with an embodiment of the present invention.

One embodiment is a clock tree visualizer that generates a graphical user interface ("GUI") from a text-based netlist of a clock tree that allows an integrated circuit ("IC") designer to visualize the clock tree in the form of symbolic gates connected in accordance with the IC design and displayed in an untangled manner. The display may be interlaced with all the necessary design details, such as simulation results and the specification. As a result, instead of reviewing text files to determine which gates are the cause of any problems, the designer can spot problematic gates relatively easily.

In general, with advanced IC design, the design of a clock tree follows a mixed-mode approach which includes designing the path of the tree followed by customization. Starting from a specification, a register-transfer level ("RTL") description is created, followed by synthesis, verification and physical layout. During the final stage, the clock tree, including headers (e.g., clock buffers, inverters, or any element that amplifies the clock signal) and interconnects, are extracted to represent the physical layout of the IC in the form of Simulation Program with Integrated Circuit Emphasis ("SPICE") netlist. The SPICE netlist is then simulated to ensure timing closure.

The IC designers that typically are involved in verifying and debugging the netlist of an extracted clock tree in the final stage are different from those involved in designing the architecture of the clock tree. These designers generally have little or no idea about the unknown clock design with its complex structure. The extracted netlist is typically flat in that there is no structural hierarchy within the netlist (i.e., all physical devices such as MOSFET, resistors, capacitors, etc., are available directly from the main circuit represented by the netlist and are not a part of any sub-circuit). Therefore, readability, even when compared to the pre-layout hierarchical netlist, is very poor due to device and net names which often change and the difficulty in comparing pre-layout and post-layout output signals.

The final stage of the design may require several iterations of simulation, verification and custom modification of the clock headers as well as the interconnects before the sign-off. A typical clock tree can include several thousand headers, which include inverters and buffers, and the extracted netlist can include millions of linear and non-linear devices in the SPICE format. Therefore, when the clock tree netlist is simulated for static timing analysis, and if the arrival time, slew rate and clock skew at the sinks of the clock tree does not meet the requirements, it becomes very difficult to visualize the source of the arrival time, the slew rate or the skew failure or to identify which sub-tree is failing because there is no schematic for the extracted clock tree.

In contrast, embodiments of the present invention allow the designer to visualize the entire clock tree as a whole and to determine a faulty header, which can then be tuned to different size/strength for required performance. Once the faulty header is corrected, the process of simulation verification and modification can be repeated until the entire clock tree passes the test.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD") that is used to display the untangled clock tree, as described in detail below. A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an IC clock tree visualizer module 16 for providing a clock tree visualization, as disclosed in more detail below. System 10 can be part of a larger system, such as a test bed system. Therefore, system 10 can include one or more additional functional modules 18 to include the additional functionality. A database 17 is coupled to bus 12 to provide centralized storage for modules 16 and 18 and store data such as device models, simulation generated data, etc.

In general, when designing an IC, the clock tree design starts from the requirement specification, which leads to the creation of the register transfer level ("RTL") design. The RTL is created in a hardware description language ("HDL") to capture its behavior, and is then synthesized. After the verification, the synthesized clock tree is placed and routed. Finally, the physical layout of the clock tree is generated, including RC parasitics, followed by the post-Layout timing analysis.

After generating the physical layout, the overall methodology of clock network analysis includes parasitics extraction, SPICE deck generation, circuit simulation and report phases. Initially, the design is represented by the layout which incorporates clock nets along with the signal and power nets in the form of physical shapes such as rectangles and polygons associated with fabrication metal layers, as well as metal transitions between the layers such as vias. The physical design layout further includes header cells such as clock buffers and inverters. The headers are connected by metal wires in the form of the tree or grid. There are multiple stages of the clock design connected together through the headers.

Parasitics extraction is performed to generate the electrical netlist that corresponds to the physical design layout which includes resistors and capacitors of the clock interconnects along with coupling capacitors to account for the physical proximity to other nets. Headers are typically a part of a cells library and extracted separately.

The purpose of SPICE deck generation is to match the interconnect ports to the headers inputs and outputs according to the initial layout connectivity, and to produce a circuit netlist which can be handled by a transistor level circuit simulation tool. Further, it creates appropriate voltage sources and signal measurements, to calculate clock delay and skew across the network. After the SPICE simulation is performed, the stage specific and global reports for delays, slew rates and clock skew are generated. Any violation in the timing analysis is fixed by modifying the design.

Figure 2:
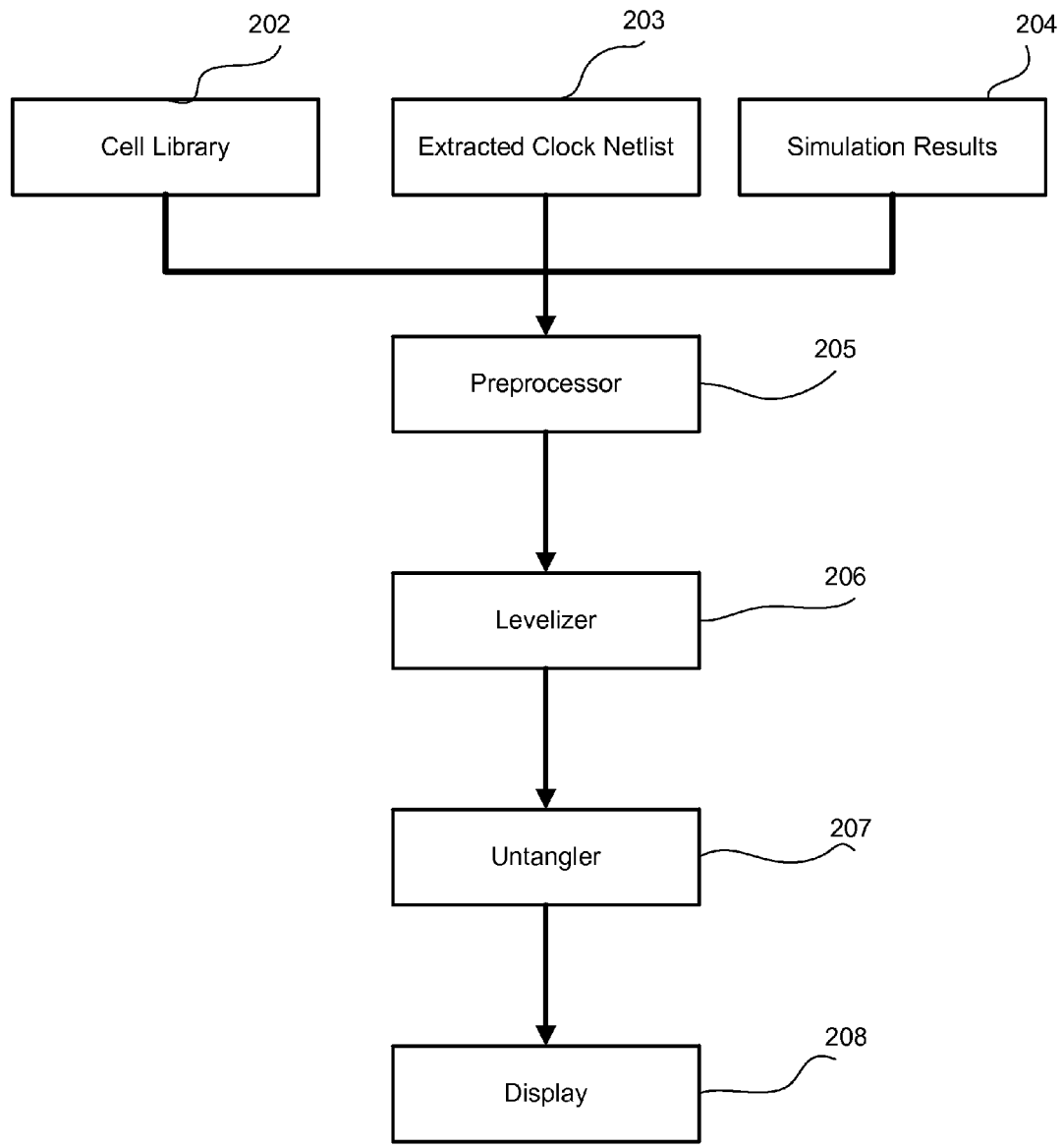
FIG. 2 is a flow diagram of the functionality of the IC clock tree visualizer module of FIG. 1 when providing a clock tree visualization in accordance with one embodiment.

Embodiments of the present invention provide a visualization of the clock tree after the SPICE simulation portion of the clock tree design. Embodiments provide a GUI of the high level untangled clock tree showing distinctive headers with simulation results for the purpose of debugging. FIG. 2 is a flow diagram of the functionality of IC clock tree visualizer module 16 of FIG. 1 when providing a clock tree visualization in accordance with one embodiment. In one embodiment, the functionality of the flow diagram of FIG. 2, and FIGS. 4-6 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

As described above, as part of the design of an IC clock tree, at 202 the cell library is extracted, at 203 the extracted flat clock tree text based netlist is generated (i.e., the SPICE deck), and at 204 the simulation results are generated.

At 205, a preprocessor generates an internal data structure for all the headers in the clock tree SPICE deck. The transistor level to gate level abstraction is done with the help of the extracted cell library by matching the individual extracted headers in the SPICE deck with those in the cell library, which also includes additional information about the header, such as its strength. Finally, from the simulation, all of the static timing analysis ("STA") based results are also stored in the header structure.

Figure 3:
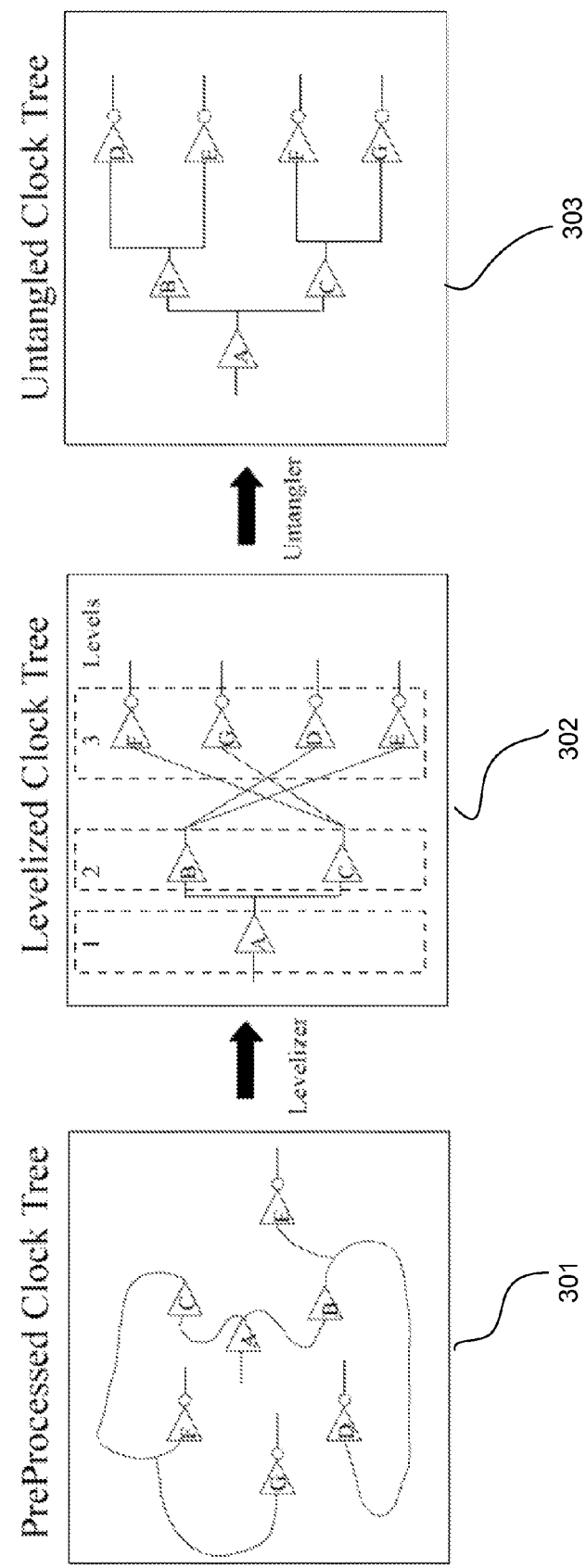
FIG. 3 is a block diagram that illustrates the results after the stages of FIG. 2 for embodiments of the present invention.

FIG. 3 is a block diagram that illustrates the results after the stages 205-208 of FIG. 2 for embodiments of the present invention. After the preprocessing at 205, the result is a preprocessed clock tree 301 that includes an internal structure of all the headers with required information. The preprocessing at 205 in general processes the original raw netlist (e.g., a text file) and creates an internal structure to store all the headers and the fan-in and fan-out along with simulation results. The headers in the extracted netlist can be identified either through direct match with the cell library or using standard structural recognition or pattern matching algorithm.

In order for the internal structure of the preprocessed clock tree to display the tree-like structure for the headers, at 206 of FIG. 2 a levelizer divides the entire list of headers into different levels based on the interconnects. In one embodiment, the level of the header is determined by the highest level of its fan-ins plus 1. The level of the primary inputs, as the starting points, is 0 or the lowest level, and the level of the sinks, as the end points, have the highest levels. Once levelized, the headers can be displayed according to the levels. However the interconnections will make the tree appear enmeshed, making it difficult to properly visualize the tree like structure, as shown by the levelized clock tree 302 of FIG. 3.

In order to make the tree clutter free, at 207 an untangler unwinds the nets as it goes from the lowest level to the highest level. For each of the header in the current level, the untangler orders its fan-outs so that the first group of fan-outs belongs to the first header, the second group of fan-outs belong to the second header, and so on. The resulting ordered list of headers is now divided into different levels/columns and each level has headers distributed in the least cluttered manner, as shown by the untangled clock tree 303 of FIG. 3. The headers along with the interconnections and the simulation results are then displayed at 208 on any type of display such as display 24 of FIG. 1, for further analysis. As part of the levelizing, the fan-outs of a particular gate are grouped so that there are no cross-overs between the wires.

Figure 4:
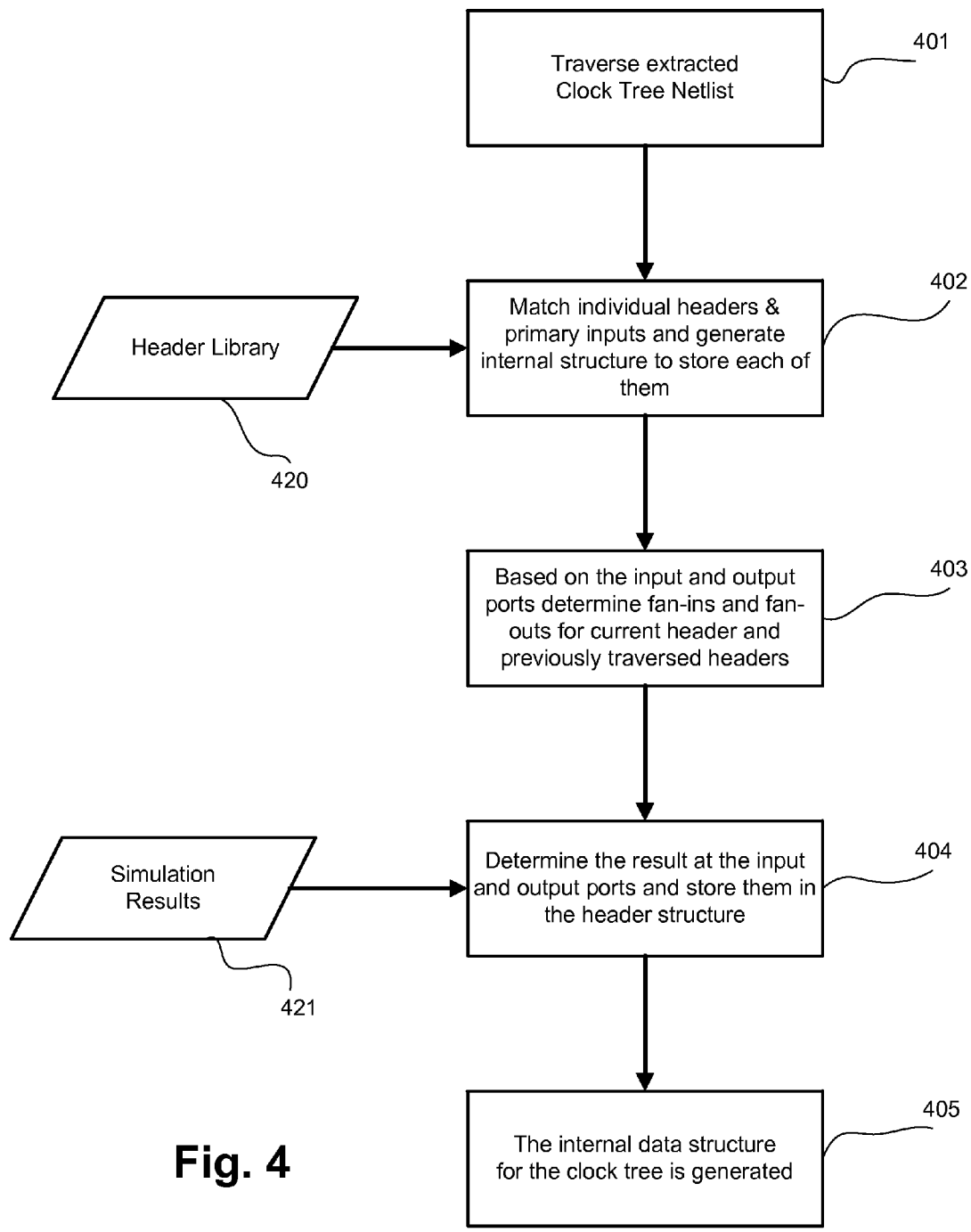
FIG. 4 is a flow diagram of the functionality of the IC clock tree visualizer module of FIG. 1 when performing the pre-processing of FIG. 2 in accordance with one embodiment.

FIG. 4 is a flow diagram of the functionality of IC clock tree visualizer module 16 of FIG. 1 when performing the preprocessing 205 of FIG. 2 in accordance with one embodiment.

At 401, the extracted clock tree netlist is traversed.

At 402, using an input of the header library at 420, individual headers and primary inputs are matched, and an internal structure is generated to store each of them.

At 403, based on the input and output ports, fan-ins and fan-outs for the current header and previously traversed headers are determined.

At 404, using as input the simulation results 421, the result at the input and output ports are determined and stored in the header structure.

At 405, the internal data structure for the clock tree is generated. The resultant internal representation is shown at 301 of FIG. 3.

Figure 5:
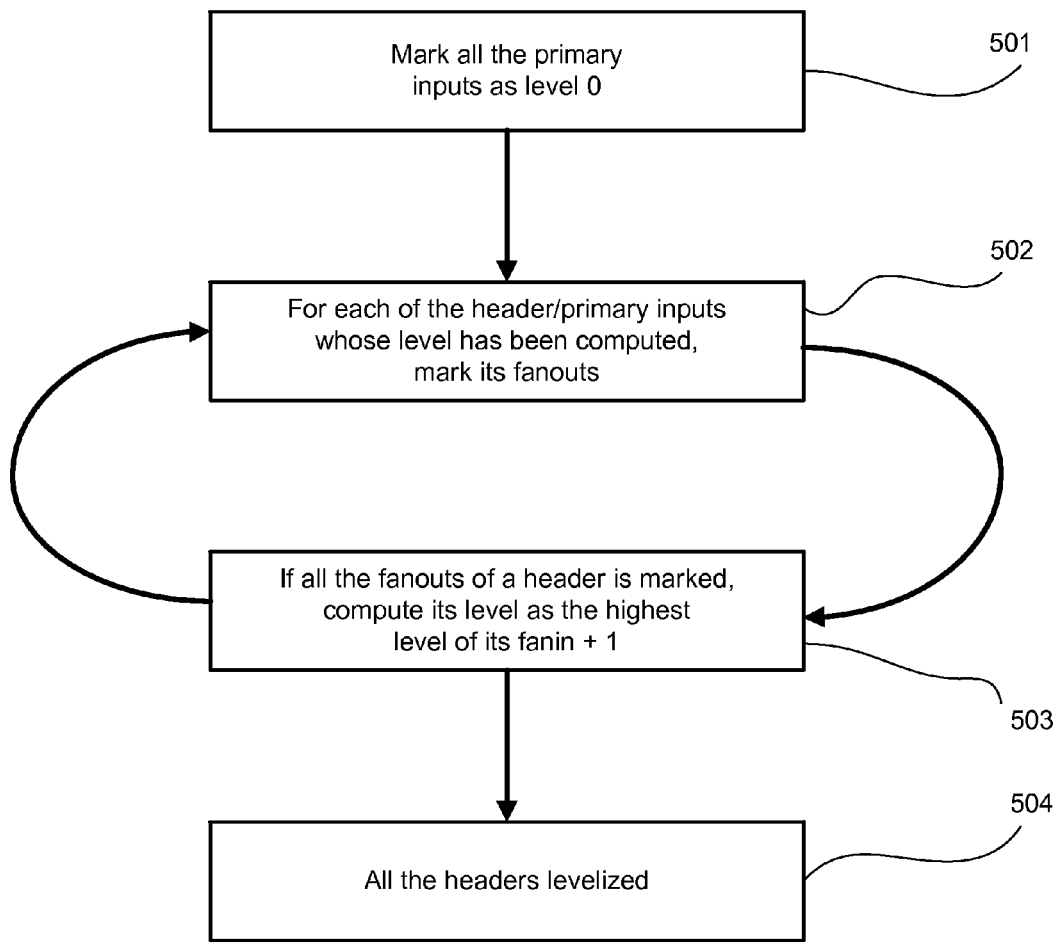
FIG. 5 is a flow diagram of the functionality of the IC clock tree visualizer module of FIG. 1 when performing the levelizing of FIG. 2 in accordance with one embodiment.

FIG. 5 is a flow diagram of the functionality of IC clock tree visualizer module 16 of FIG. 1 when performing the levelizing 206 of FIG. 2 in accordance with one embodiment.

At 501, all the primary inputs are marked as level 0.

At 502, for each of the header/primary inputs whose level has been computed, its fan-outs are marked.

At 503, if all the fan-outs of a header are marked, its level is determined to be the highest level of its fan-in+1. 502 and 503 are repeated for each header/primary inputs.

At 504, all of the headers are levelized. The resultant internal representation is shown at 302 of FIG. 3.

Figure 6:
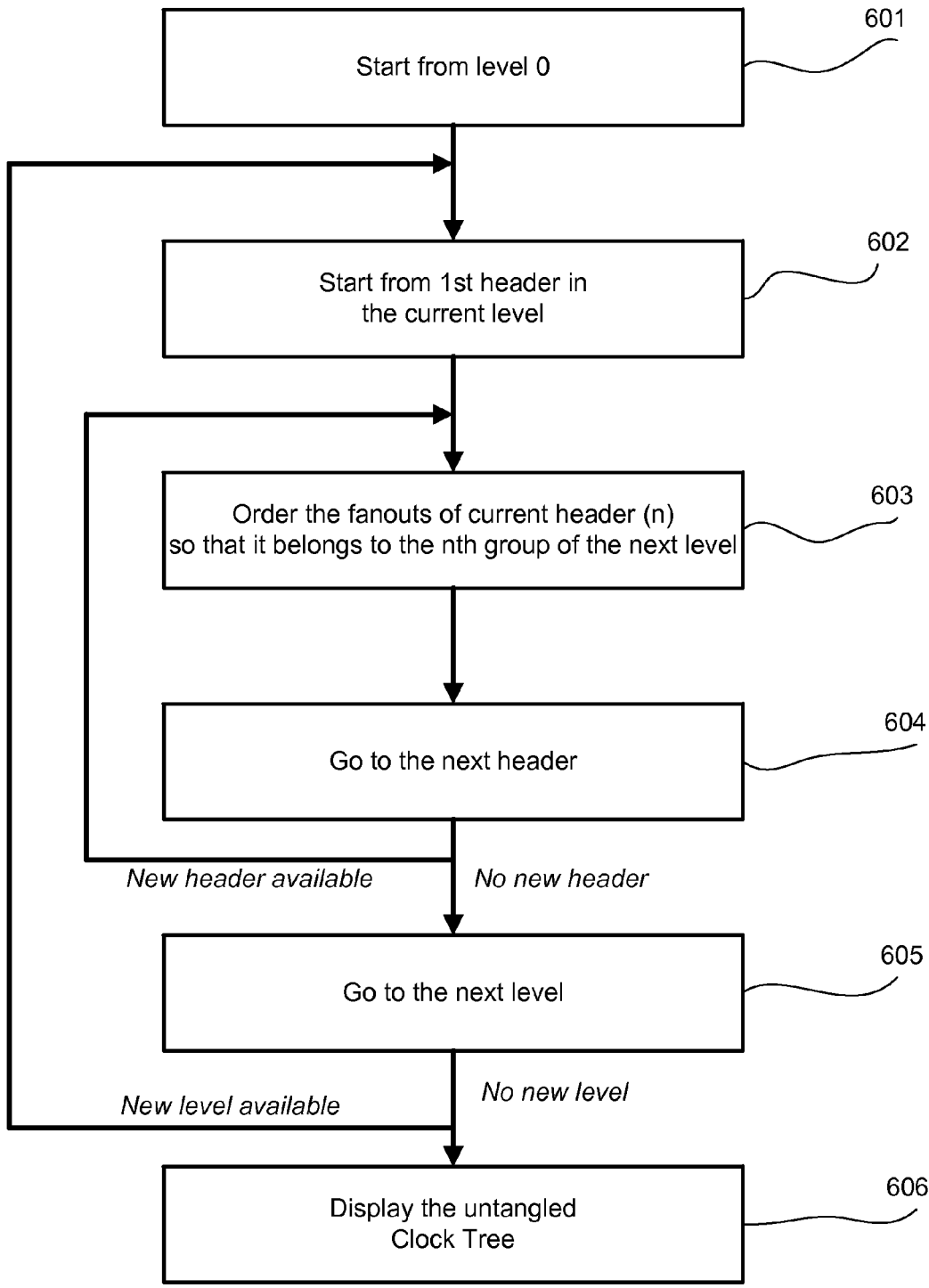
FIG. 6 is a flow diagram of the functionality of the IC clock tree visualizer module of FIG. 1 when performing the untangling of FIG. 2 in accordance with one embodiment.

FIG. 6 is a flow diagram of the functionality of IC clock tree visualizer module 16 of FIG. 1 when performing the untangling 207 of FIG. 2 in accordance with one embodiment.

At 601, the functionality starts from level 0.

At 602, the functionality starts from the first header in the current level.

At 603, the fan-outs of the current header (n) are ordered so that the fan-outs belong to the nth group of the next level.

At 604, functionality continues to the next header if a new header is available and the functionality continues at 603. If there is no new header available, functionality continues at 605.

At 605, the functionality continues to the next level if a new level is available and the functionality continues at 602. If there is no new level available, functionality continues 606.

Figure 7:
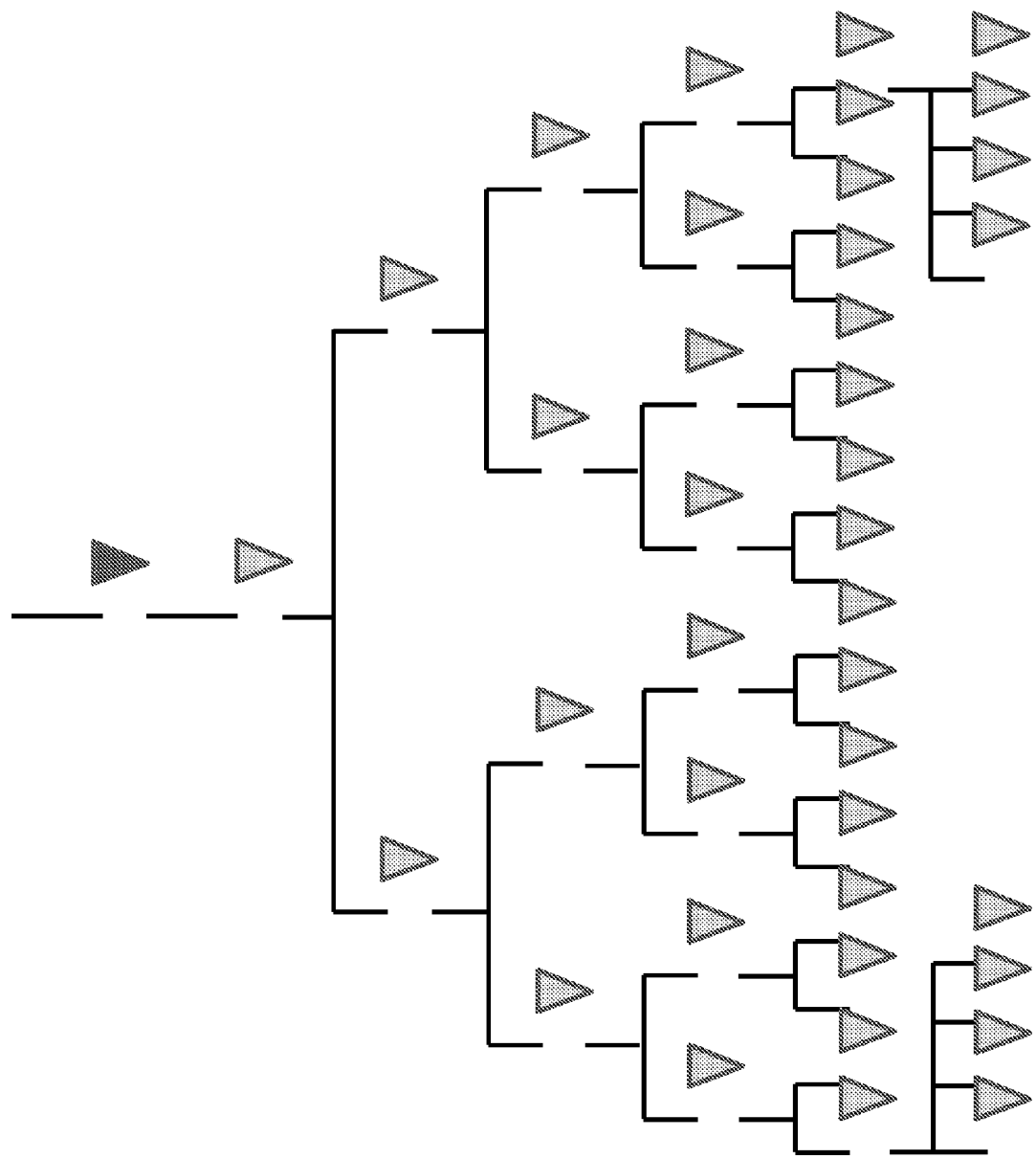
FIG. 7 illustrates a more complex example of a display of an untangled clock tree in accordance to one embodiment.

At 606, the untangled clock tree is displayed, such as is shown at 303 of FIG. 3. FIG. 7 illustrates a more complex example of a display of an untangled clock tree in accordance to one embodiment. A typical untangled clock tree may include 8 or more levels and thousands of headers.

As shown in the example displays of FIGS. 3 and 7, the entire clock tree representing the text-based clock tree netlist is shown in a visually appealing tree format using symbolic gates in a manner that defines the propagation of the clock signal and also the inter-connectivity between the gates as per the design are visible in the least tangled manner. Although not shown, vital information such as simulation results (e.g., arrival time, slew and skew) along with the specification can also be displayed to understand the quality of the clock tree. This visual display helps the designers to quickly identify the source of a failure and make the required modification in the design.

As disclosed, embodiments generate a GUI-based symbolic clock tree. Embodiments first match headers inside the extracted text-based netlist against a cell library to identify the type of headers and also the inter-connectivity between the headers/gates. Next, in order to unfold the true structure of the clock tree, embodiments levelize the circuit. Embodiments then determine the position of the header relative to the primary inputs in order to organize the clock headers into different levels. Within each level, the clock headers are arranged in a manner such that cross-overs in the nets are minimized by untangling. The resultant GUI based, gate level and wire untangled clock tree enables IC designers to rapidly proceed with post-layout verification by easing their task to track faults in the circuit through easy viewing and easy analyzing of the results.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to visualize a clock tree for an integrated circuit, the visualizing comprising:

receiving an extracted cell library, an extracted text-based clock netlist of an integrated circuit design comprising clock headers and interconnects, and simulation results of the integrated circuit design;

generating an internal data structure for the clock headers;

dividing the clock headers into a plurality of levels based on the interconnects;

ordering the clock headers from a lowest level to a highest level, wherein the ordering untangles the interconnects; and displaying on a graphical user interface the ordered clock headers and the untangled interconnects of the integrated circuit design.

2. A computer-readable medium of claim 1, wherein the extracted clock netlist comprises a Simulation Program with Integrated Circuit Emphasis (SPICE) deck.

3. The computer-readable medium of claim 2, the preprocessing comprising matching extracted headers in the SPICE deck with extracted cell library headers.

4. The computer-readable medium of claim 1, wherein each clock header comprises one or more fan-ins, and a level of a header is a highest level of the corresponding fan-ins plus 1.

5. The computer-readable medium of claim 1, wherein the ordering comprises grouping fan-outs to eliminate cross-overs.

6. The computer-readable medium of claim 1, wherein the ordering comprises:

starting at a first level and a first header within the first level, ordering fan-outs of a current header of a current level;

ordering a next header of the current level and repeating until all headers of the current level are ordered; and continuing to a next level and repeating the ordering fan-outs and ordering the next header until all levels of the clock headers are ordered.

7. The computer-readable medium of claim 1, further comprising annotating simulation results onto the display of the ordered clock headers.

8. The computer-readable medium of claim 1, wherein the clock headers comprise at least one of a buffer or inverter.

9. A method of visualizing a clock tree for an integrated circuit, the method comprising:
   receiving an extracted cell library, an extracted text-based clock netlist of an integrated circuit design comprising clock headers and interconnects, and simulation results of the integrated circuit design;
   generating, at a processor, an internal data structure for the clock headers;
   dividing, at the processor, the clock headers into a plurality of levels based on the interconnects;
   ordering, at the processor, the clock headers from a lowest level to a highest level, wherein the ordering untangles the interconnects; and
   displaying on a graphical user interface the ordered clock headers and the untangled interconnects of the integrated circuit design.

10. A method of claim 9, wherein the extracted clock netlist comprises a Simulation Program with Integrated Circuit Emphasis (SPICE) deck.

11. The method of claim 10, wherein the preprocessing comprises matching extracted headers in the SPICE deck with extracted cell library headers.

12. The method of claim 9, wherein each clock header comprises one or more fan-ins, and a level of a header is a highest level of the corresponding fan-ins plus 1.

13. The method of claim 9, wherein the ordering comprises grouping fan-outs to eliminate cross-overs.

14. The method of claim 9, wherein the ordering comprises:
   starting at a first level and a first header within the first level,
   ordering fan-outs of a current header of a current level;
   ordering a next header of the current level and repeating until all headers of the current level are ordered; and
   continuing to a next level and repeating the ordering fan-outs and ordering the next header until all levels of the clock headers are ordered.

15. The method of claim 9, further comprising annotating simulation results onto the display of the ordered clock headers.

16. The method of claim 9, wherein the clock headers comprise at least one of a buffer or inverter.

17. An integrated circuit simulation system comprising:
   a preprocessor that receives an extracted cell library, an extracted text-based clock netlist of an integrated circuit design comprising headers and interconnects for an integrated circuit clock tree, and simulation results of the integrated circuit design, and generates an internal data structure for the headers;
   a levelizer that divides the headers into a plurality of levels based on the interconnects;
   an untangler that orders the headers from a lowest level to a highest level, wherein the ordering untangles the interconnects; and
   a display that displays on a graphical user interface the ordered headers and the untangled interconnects of the integrated circuit design.

18. The integrated circuit simulation system of claim 17, wherein the extracted clock netlist comprises a Simulation Program with Integrated Circuit Emphasis (SPICE) deck.

19. The integrated circuit simulation system of claim 17, wherein the untangler groups fan-outs to eliminate cross-overs.

20. The integrated circuit simulation system of claim 17, further comprising annotating simulation results onto the display of the ordered headers.

21. The integrated circuit simulation system of claim 17, wherein the headers comprise at least one of a buffer or inverter.

* * * * *